(12) United States Patent
Dutta et al.

(10) Patent No.: US 8,522,217 B2
(45) Date of Patent: Aug. 27, 2013

(54) VISUALIZATION OF RUNTIME ANALYSIS ACROSS DYNAMIC BOUNDARIES

(75) Inventors: Suhail Dutta, Seattle, WA (US); Brian Crawford, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 12/763,338

(22) Filed: Apr. 20, 2010

(65) Prior Publication Data

US 2011/0258611 A1  Oct. 20, 2011

(51) Int. Cl.
*G06F 9/44* (2006.01)
(52) U.S. Cl.
USPC ............ 717/131; 717/127; 717/132; 717/133
(58) Field of Classification Search
None
See application file for complete search history.

(56) References Cited

U.S. PATENT DOCUMENTS

| | | | |
|---|---|---|---|
| 5,185,867 A | 2/1993 | Ito | |
| 5,485,601 A | 1/1996 | Ching | |
| 5,615,367 A | 3/1997 | Bennett et al. | |
| 5,924,109 A | 7/1999 | Ackerman et al. | |
| 6,789,054 B1 | 9/2004 | Makhlouf | |
| 7,293,256 B2 * | 11/2007 | Crawford | 717/124 |
| 7,464,363 B2 * | 12/2008 | Sasaki et al. | 716/138 |
| 7,506,320 B2 * | 3/2009 | Bhandari et al. | 717/133 |
| 7,627,671 B1 * | 12/2009 | Palma et al. | 709/224 |
| 8,356,288 B2 * | 1/2013 | Neufeld et al. | 717/131 |
| 2003/0233636 A1 * | 12/2003 | Crawford | 717/127 |
| 2006/0053414 A1 * | 3/2006 | Bhandari et al. | 717/133 |
| 2006/0277510 A1 * | 12/2006 | Sasaki et al. | 716/5 |
| 2007/0006175 A1 * | 1/2007 | Durham et al. | 717/131 |
| 2007/0074173 A1 * | 3/2007 | Ferren et al. | 717/127 |
| 2009/0100415 A1 * | 4/2009 | Dor et al. | 717/131 |
| 2009/0282393 A1 * | 11/2009 | Costa et al. | 717/132 |
| 2010/0122239 A1 * | 5/2010 | Neufeld et al. | 717/131 |

OTHER PUBLICATIONS

Stuart Marshall et al., "Dyno: a tool for dynamic Interactive Documentation", Apr. 1999 Victoria University of Wellington, 15 pages, <http://www.mcs.vuw.ac.nz/comp/Publications/CS-TR-99-5.abs.html>.*
T. Dean Hendrix et al.; An Extensible Framework for Providing Dynamic Data Structure Visualizations in a Lightweight IDE; 2004 ACM; pp. 387-391; <http://dl.acm.org/citation.cfm?id=971433>.*
Nick Mitchell; The Runtime Structure of Object Ownership; 2006 Springer; pp. 74-98; <http://link.springer.com/content/pdf/10.1007%2F11785477_5.pdf>.*
Jenn-Yuan Tsai et al.; The Superthreaded Architecture: Thread Pipelining with Run-Time Data Dependence Checking and Control Speculation; 1996 IEEE; pp. 35-46; <http://ieeexplore.ieee.org/stamp/stamp.jsp?tp=&arnumber=552553>.*

(Continued)

*Primary Examiner* — Thuy Dao
*Assistant Examiner* — Cuong V Luu
(74) *Attorney, Agent, or Firm* — Ogilvie Law Firm

(57) ABSTRACT

Enhanced software architecture diagrams are derived by correlating runtime and static information, thereby allowing the diagrams to span runtime determination boundaries. Runtime determination boundaries are defined by decisions made at runtime, e.g., client-server boundaries, machine-machine boundaries, database-querying program boundaries, web service provider-consumer boundaries, factory caller-instance boundaries, interface call-implementing class boundaries, and reflection boundaries. Correlation may involve identifying instances of types, tracing an identifier injected into a communication channel, using a causality hook, and/or comparing messages leaving a caller with messages entering a callee, for example.

20 Claims, 7 Drawing Sheets

(56) References Cited

OTHER PUBLICATIONS

Changhee Jung et al.; DDT: Design and Evaluation of a Dynamic Program Analysis for Optimizing Data Structure Usage; 2009 ACM; pp. 56-66;<http://ieeexplore.ieee.org/stamp/stamp.jsp?tp=&arnumber=5375321>.*

Jean-Luc Gaudlot; Sructure Handing in Data-FlOw Sstems; 1986 IEEE; pp. 489-502; <http://ieeexplore.ieee.org/stamp/stamp.jsp?tp=&arnumber=5009426>.*

Joseph M. Hellerstein et al.; Interactive Data Analysis: The Control Project; 1999 IEEE; 99. 51-89; <http://ieeexplore.ieee.org/stamp/stamp.jsp?tp=&arnumber=781635>.*

Nimmer, Jeremy W., "Automatic Generation and Checking of Program Specifications", Retrieved at << http://citeseerx.ist.psu.edu/viewdoc/download?doi=10.1.1.18.5742&rep=rep1&type=pdf >>, MIT Laboratory for Computer Science technical report 852, Jun. 10, 2002, pp. 1-59.

Protsko, at al., "Towards the Automatic Generation of Software Diagrams", Retrieved at << http:ieeexplore.ieee.org/stamp/stamp.jsp?tp=&arnumber=67575&isnumber=2397 >>, IEEE Transactions on Software Engineering, vol. 17, No. 1, Jan. 1991, pp. 10-21.

"FxCop", Retrieved at << http://msdn.microsoft.com/en-us/library/bb429476(VS.80,printer).aspx >>, no later than Mar. 31, 2010, pp. 1.

"IntelliTrace Info : Historical Debugging in Visual Studio Team System 2010", Retrieved at <<http://blogs.msdn.com/ianhu/archive/2009/05/13/historical-debugging-in-visual-studio-team-system-2010.aspx >>, May 13, 2009, pp. 5.

"PREfast for Drivers": Retrieved at << http://www.microsoft.com/whdc/DevTools/tools/PREfast.mspx >>, no later than Mar. 13, 2010, pp. 2.

"John Robbins'Blog : How Does VS2010 Historical Debugging Work?", Retrieved at << http://www.wintellect.com/CS/blogs/jrobbins/archive/2009/06/16/how-does-vs2010-histoncal-debugging-work.aspx >>, Jun. 16, 2009, pp. 14.

"John Robbins' Blog : VS 2010 Beta 2 IntelliTrace In-Depth First Look", Retrieved at << http://www.wintellect.com/CS/blogs/jrobbins/archive/2009/10/19/vs-2010-beta-2-intellitrace-in-depth-first-look.aspx >>, Oct. 19, 2009, pp. 12.

* cited by examiner

VISUALIZATION OF RUNTIME ANALYSIS ACROSS DYNAMIC BOUNDARIES

BACKGROUND

A variety of tools and techniques are used for computer program analysis. Partially or fully automated program analysis may assist in program optimization, program verification, program implementation (initial creation and/or subsequent modification), program defect detection, program porting, and other efforts. A given approach may examine and/or utilize type systems, source code annotations, model checking, architecture diagrams, performance profiles, instrumentation, program slicing, inheritance/dependency graphs, and/or other tools and techniques while analyzing the behavior of computer programs.

Two differing approaches taken in program analysis are dynamic program analysis and static program analysis. Dynamic program analysis is performed by executing programs on real and/or virtual processor(s). Test inputs may be selected in an effort to produce interesting program behavior for dynamic analysis; input from a live production server may also be used in some cases. Techniques such as code coverage may help ensure that a representative sample of the tested program's possible behaviors is obtained. However, instrumentation used to obtain dynamic test data may alter the execution speed and/or other characteristics of the tested program. Static code analysis is performed without executing the program that is being analyzed. Static analysis may be performed on source code, on intermediate or other object code, or on both. The depth and breadth of static analysis varies, from analyses that only consider individual statements and declarations, to analyses that consider the complete source code of a program, for example.

SUMMARY

Some software applications combine pieces that serve different roles, use different technologies, come from different vendors, and/or otherwise differ from one another. As a result, boundaries may be defined between various parts of a software application. However, analysis tools used to generate architecture diagrams are often unable to automatically cross the boundaries, so developers lack information that could help improve or adapt the application.

Some embodiments described herein provide one or more approaches for correlating software architecture diagrams using runtime generated data to provide enhanced architecture diagrams that span runtime determination boundaries. "Runtime determination boundaries" are boundaries in an architecture which are defined at least in part by decisions made at runtime and hence are not amenable to purely static program analysis. Some examples of runtime determination boundaries include client-server boundaries, machine-machine boundaries, database-querying program boundaries, web service provider-consumer boundaries, factory caller-instance boundaries, interface call-implementing class boundaries, and reflection boundaries.

Some approaches provided herein locate a runtime determination boundary in a software architecture, obtain runtime information for an execution of a program (i.e., an instance of the software architecture), and correlate the runtime information with static software architecture diagram(s). For example, the runtime information might be correlated with a sequence diagram, a layer diagram, an activity diagram, a class diagram, and/or a dependency diagram. Correlation may be accomplished by identifying instances of types, by tracing an identifier injected into a communication channel, by using a causality hook, and/or by comparing messages leaving a caller with messages entering a callee, for example.

Approaches described herein produce an enhanced architecture diagram which documents the execution history across the runtime determination boundary. The program could then be executed again, and a second enhanced architecture diagram could be produced to document the second execution history across the runtime determination boundary. Comparison of the two enhanced architecture diagrams may help developers better understand the program. Similarly, a different version of the program could be executed, and that runtime information could be used to produce another enhanced architecture diagram spanning the runtime determination boundary. Metadata may also be attached to a data source and propagated across the runtime determination boundary.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
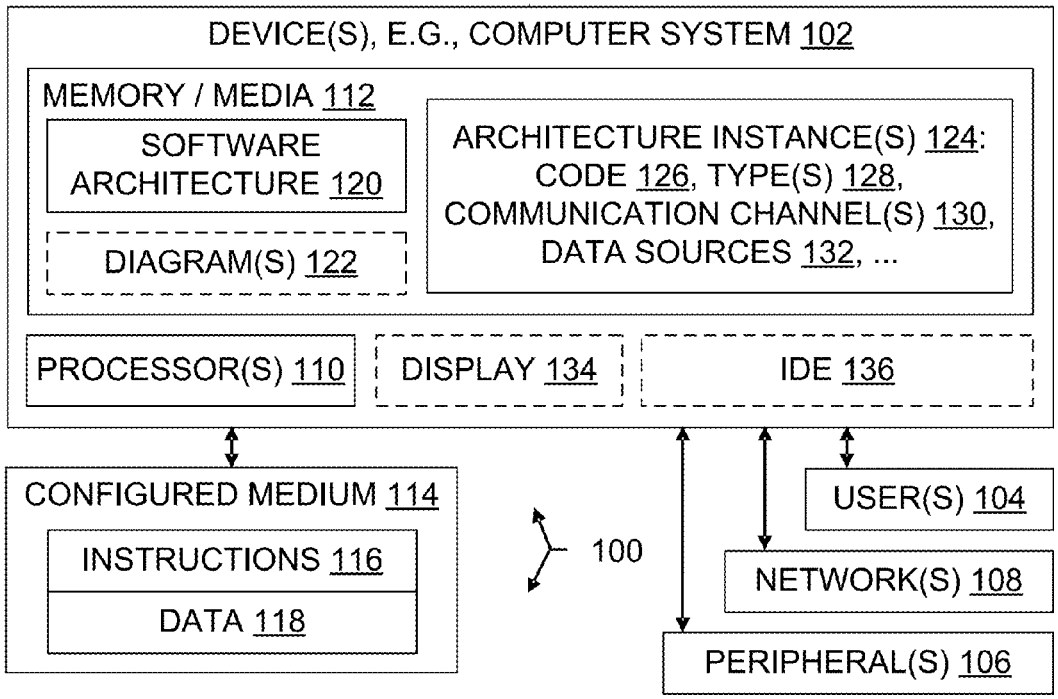
FIG. 1 is a block diagram illustrating a computer system having at least one processor, at least one memory, at least one instance of a software architecture, such as an application program, and having other items in an operating environment which may be present on multiple network nodes, and also illustrating configured storage medium embodiments.

Current software applications use a variety of technologies and techniques to help decouple various parts of a given application. Some examples of decoupling technologies/ techniques include web services and other remote procedure/invocation technologies, database calls, and factory patterns. Other examples of decoupling components are also discussed herein and/or familiar to developers. Decoupling creates a well-defined set of boundaries between various parts of the application or between different applications. These boundaries are crossed at runtime, through actions such as an order processing component making a call to an external credit card processing service, an inventory system calling into an inventory database to retrieve quantity information, creation of a graphical user interface (GUI) based on a system configuration, and many others.

Generation of architectural diagrams from an existing application is often helpful, and sometimes vital, for understanding the application so that it may be improved or maintained. However, the generation of such diagrams is often incomplete because of the aforementioned boundaries. Static analysis tools that are used to generate these diagrams have no adequate way to automatically cross these system boundaries and document the results. In the first of the examples above, for instance, a static diagram would show all the calls within the order processing system but not the call into the credit card processing service and its subsequent processing. Likewise, in the second example a static diagram would show the inventory logic but would be unable to show the database call and any subsequent processing. In the third example, static analysis of code would be inadequate for depicting exactly which GUI was created.

Some embodiments described herein provide a set of features that facilitate and support generation of architecture diagrams which span decoupled system boundaries. Such features may be provided in development tools, such as a version of the Microsoft® Visual Studio® Team System solution, and other authorized tools (marks of Microsoft Corporation). Some of these features include dynamic logging and tracing for running applications, static analysis of the source code of an application (e.g, generation of sequence diagrams from source), instrumentation of existing code to produce a runtime trace, an analysis engine capable of merging the above traces into one data graph, and generation of enhanced architectural diagrams using such data graph(s).

Some examples of corresponding capabilities are illustrated in the following scenario. A user engages dynamic logging for some or all parts of an application to be analyzed. The user runs the application to provide runtime data for an analysis. On running the application, an embodiment generates appropriate logs and traces. These traces may contain identifiers, e.g., Universal Resource Identifiers (URIs) and other IDs for types, methods, and services. Alternatively, some or all of the runtime data may be gathered from a simulation of an execution of the application, e.g., by running the application on a hardware or software simulator. As used herein, "execution" to produce runtime data includes both possibilities, namely, live execution and/or simulated execution. An analysis engine constructs a data graph for the traces and/or other runtime data, and stitches together calls across system boundaries using the identifiers. The embodiment uses the data graph to construct an enhanced architectural diagram, e.g., a sequence diagram which is correlated with, and visually enhanced by, the runtime information.

Some embodiments provide a common addressing scheme for application artifacts such as types, methods and calls between those methods. This addressing scheme can be shared by the static and dynamic analysis codes. Some provide a process to link these multiple graphs together using the shared addressing scheme. In cases where an automated linking is not possible, some embodiments assist the user in stitching these various artifacts together.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "diagram(s)" means "one or more diagrams" or equivalently "at least one diagram".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", or "communicating to" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of media (as opposed to merely a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by correlation, injection, marking, tracing, visualization, derivation, binding, deployment, execution, modification, display, creation, loading, and/or other operations.

A software architecture 120 documents components, dependencies, actions, interactions, results, and/or other aspects of a software application, which may itself be part of, or composed of, other software application(s). Documentation may include architecture diagram(s) 122 in Unified Modeling Language (UML) and/or in other format(s), as well as manuals, version histories, specifications, and/or architecture instance(s) 124 in the form of partial or full implementations, for example. A given instance 124 typically includes source and/or object code 126, parsable definitions and implementations of types 128, parsable definitions and implementations of communication channels 130, parsable definitions and implementations of data sources 132, and other familiar incidents to software development. Applications in the form of software architecture instances 124, other software, and other items shown in the Figures may reside partially or entirely within one or more media 112, thereby configuring those media. An operating environment may also include a display 134, and other hardware such as buses, power supplies, and accelerators, for instance.

A given operating environment 100 may include an Integrated Development Environment (IDE) 136 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, and generally with endeavors that use static program analysis, dynamic program analysis, or both.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
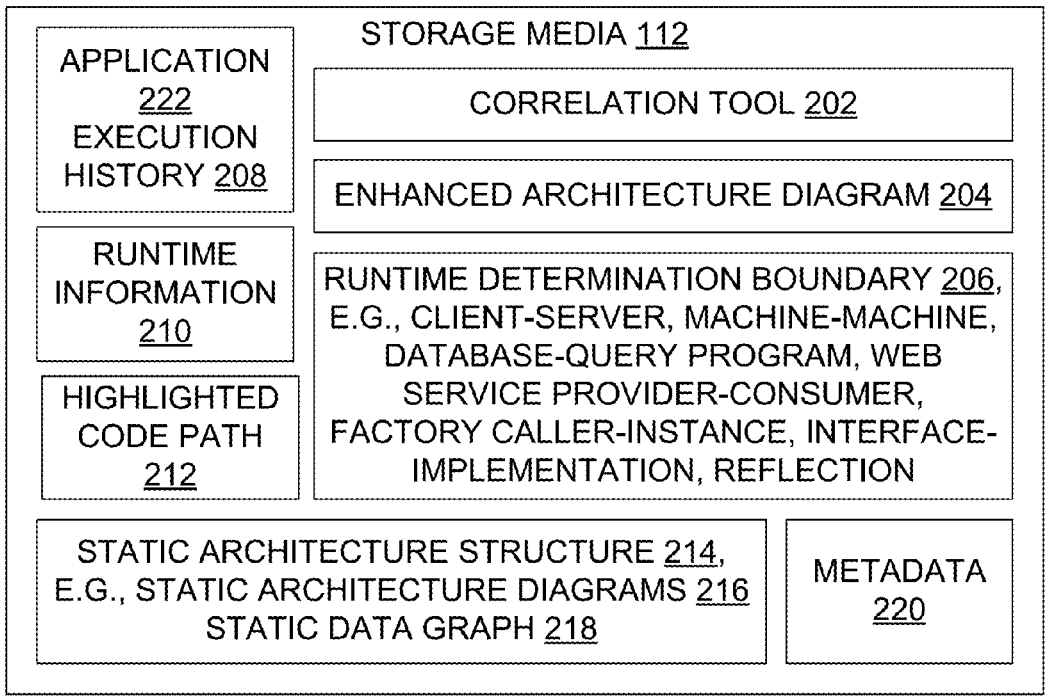
FIG. 2 is a diagram illustrating an example approach to correlation of static and runtime information for a software architecture.

FIG. 2 illustrates some aspects of static-dynamic correlation which are suitable for use with some embodiments. A correlation tool 202 correlates static and dynamic information to produce an enhanced architecture diagram 204 as taught herein. An enhanced architecture diagram 204 may span a "runtime determination boundary" 206, that is, a boundary implicating decisions made at runtime and hence not readily amenable to purely static program analysis. The enhanced architecture diagram 204 may visualize an execution history 208 (e.g., code path 212, variable values) and/or other runtime information 210 (e.g., version info, dynamic libraries loaded) which is correlated with static structures 214 such as architecture diagrams 216 and graphs 218 produced by static analysis. Diagnostic metadata 220 may also be utilized and possibly displayed in the enhanced architecture diagram 204. The metadata 220 are generated and/or attached to data sources 132 by or through the correlation tool 202, rather than by normal execution of an application 222 that is being analyzed.

With reference to FIGS. 1 and 2, some embodiments provide a computer system 102 with a logical processor 110 and a memory medium 112 configured by circuitry, firmware, and/or software to transform static and runtime information by correlating them as described herein. In some embodiments, a memory in operable communication with the logical processor holds an enhanced architecture diagram 204. The diagram 204 configures the memory by virtue of residing in the memory. The enhanced architecture diagram 204 documents an execution history 208, at least, for an application 222, that is, for an instance 124 of a software architecture 120. In particular, the diagram 204 documents the application's execution history across a runtime determination boundary 206.

In a given embodiment, the enhanced architecture diagram 204 may include and span at least one of the following runtime determination boundaries 206: a client-server boundary, a machine-machine boundary, a database-querying_program boundary, a web_service_provider-web_service_consumer boundary, a factory_caller-factory_instance boundary, an interface_call-implementing_class boundary, a reflection boundary; underbars are used herein for convenience only, to help visual identification of text describing different sides of a boundary 206. The enhanced architecture diagram 204 may include one or more of the following software architecture diagrams: a sequence diagram, a layer diagram, an activity diagram, a class diagram, a dependency diagram.

Figure 6:
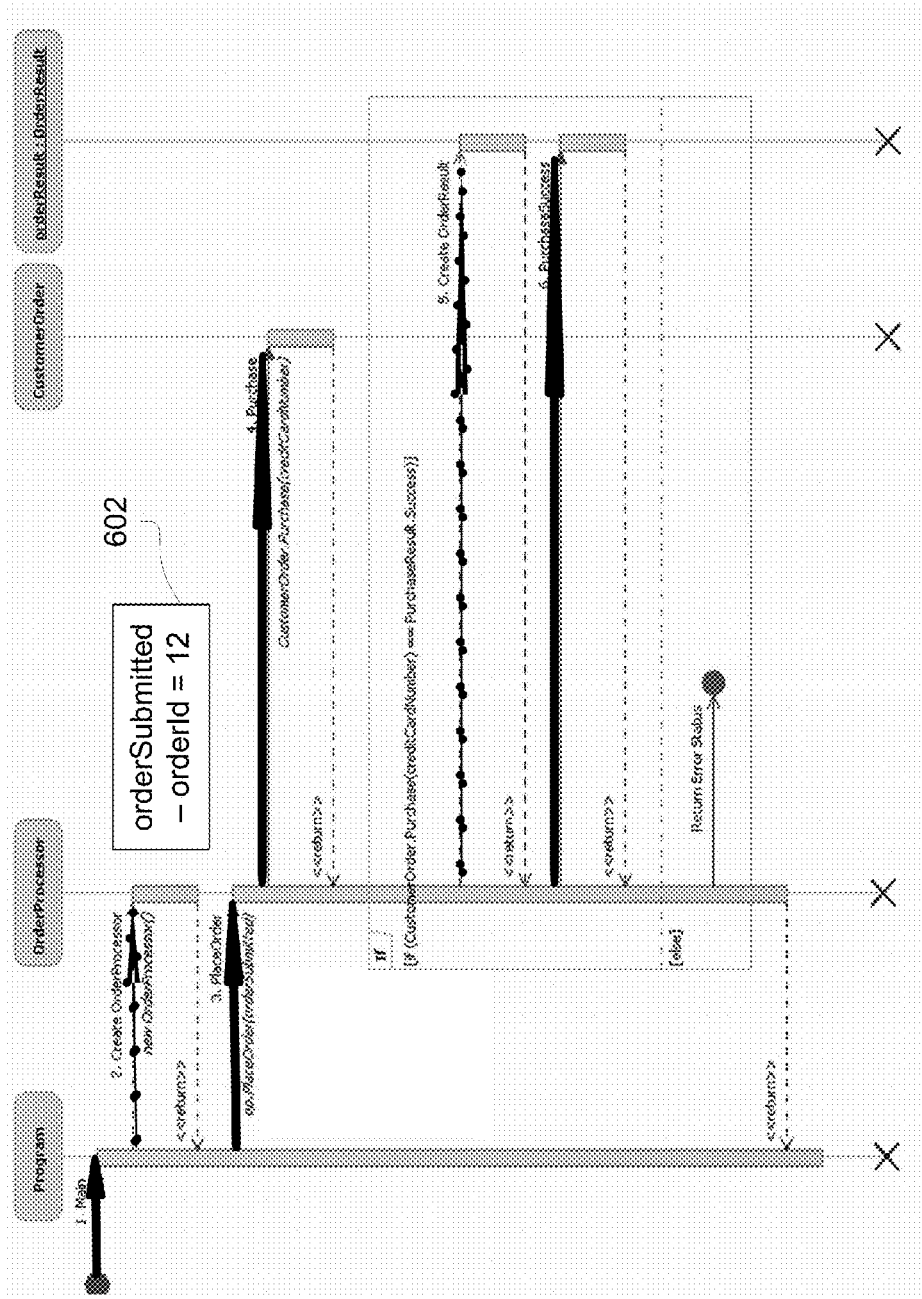
FIG. 6 shows an enhanced architecture diagram produced by correlating runtime information with the static architecture diagram of FIG. 4.

In some embodiments, the enhanced architecture diagram 204 includes a highlighted code path 212 correlated with runtime information from the execution history. For example, FIG. 6 shows an enhanced diagram 204 in which a code path 212 is highlighted using numbering and increased line widths. Although not shown in the FIG. 6 example, in some embodiments a diagram 204 includes highlighting to show the user an actual code path 212 taken across a runtime determination boundary 206. The correlation tool 202 may be used to bridge the boundary 206. The diagram 204 may be built by combining static and runtime analysis results. The code path 212 may be correlated with runtime information.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
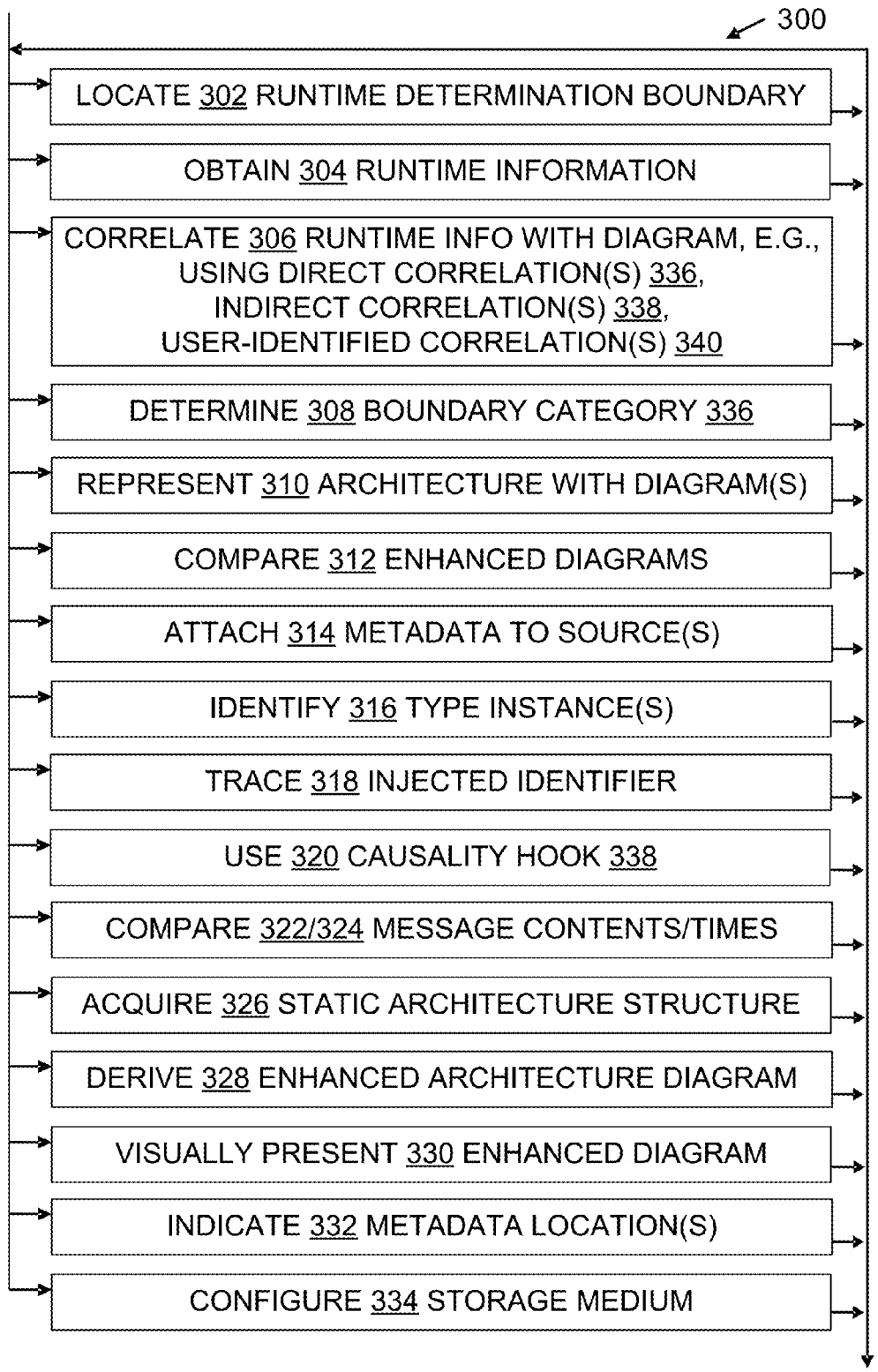
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by a correlation tool 202, IDE 136, and/or other software under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a boundary locating step 302, an embodiment locates a runtime determination boundary 206. Step 302 may be accomplished using some static analysis tools, user input through a GUI, runtime information, and/or other mechanisms, for example.

During a runtime info obtaining step 304, an embodiment obtains runtime information 210, e.g., by locating the information in a file, or in RAM. Step 304 may be accomplished using profilers, instrumentation, other dynamic analysis tools, user input through a GUI, and/or other mechanisms, for example.

During a correlating step 306, an embodiment correlates static analysis information such as static structure(s) 214 with runtime information 210 as discussed herein. Step 306 may be accomplished using results of type instance identification, "dye" injection, message comparison, and/or other techniques noted herein, for example.

During correlating step 306, a given embodiment may use one or more direct correlations 336, indirect correlations 338, and/or user-identified correlations 340. These categories are provided here for convenience; other views of the technology discussed here may categorize a particular correlation tool or technique differently.

Bearing that in mind, user-identified correlations 340 are runtime connections between architectural components that a user identifies and that can then be used to stitch together static diagrams. In some embodiments, a user can identify a correlation 340 across boundaries 206 using a set of techniques. One technique relates visual elements across architecture diagrams.

For example, a user might select a PlaceOrder method on one sequence diagram and link it to a SubmitOrder method on another diagram using a user interface visual gesture. This user-identified correlation 340 can then be used to stitch the two diagrams together directly, and to influence a runtime based analysis to generate a diagram that has those two methods linked together on subsequence generations.

Another technique relates items in source code. For example, by using a set of attributes in the source code, a user could indicate that the PlaceOrder method indirectly calls the SubmitOrder method. This user-identified correlation 340 would then be used to generate diagrams wherein the stitching happens automatically.

Another technique relates items using a user defined pattern within a correlation 340. For example, a user might input a pattern indicating say that every time analysis detects a call to an interface OrderStrategy, the analysis should link that interface with any PlaceOrder calls on any class in a specified system that uses a name matching *OrderStrategy (*being a lexical wildcard), such as "AsyncOrderStrategy".

Another technique focuses interest on a specified storage region or device, e.g., a memory or database. For example, a user might mark an OrderItem table in a database as part of a user-identified correlation 340 such that if analysis sees two separate calls that change that table, then the analysis correlates the calls.

Indirect correlations 338 are ways that components interact with each other through a "third party" (often data storage) component. For example, if component A writes an order entry record to a database, and component B retrieves that order entry for order fulfillment, static diagrams of components A and B can be connected. In some cases, the static diagram of the database may also be connected as part of an enhanced architecture diagram 204. Data storage tracing is an indirect correlation 338 technique, which may proceed as follows. When data is stored by component A at runtime (in memory storage, file storage, database storage, or any other data storage medium 112), that data can be tagged, dyed, or have its source otherwise identified. When data is retrieved by component B at runtime, the association between A and B can be determined. In addition, the association between A, B, and the data storage can be determined.

Several examples of direct correlation 336 tools and techniques are discussed below, namely, type identifying, identifier tracing, causality hooks, message content comparison, message time comparison. Another example of a direct correlation technique is communication infrastructure tracing: when a given implementation of a communication mechanism between two components has built-in tracing, the built-in tracing output (created at runtime) can be used to connect static diagrams.

During a boundary category determining step 308, an embodiment determines at least one category 336 which is consistent with a located boundary 206. A given boundary may be consistent with more than one category, e.g., a boundary may be both a web provider-consumer boundary and a machine-machine boundary 206. Some boundaries may be categorized using static information, e.g., if a static analysis identifies a database query, then the boundary may be presumed to be a database-query program boundary. Some boundaries may be categorized manually by a developer through a GUI.

Some boundaries may also be identified from runtime information. For example, consider a system having a web client and a web server. From the runtime information captured when a Simple Object Access Protocol (SOAP) request leaves a client application and then enters a server application, a correlation 306 and categorization of the runtime boundary can be made. In this case, the boundary could be put into a web service consumer-provider category. Inter-process communication provides another example. Runtime information may be captured when a message is written to a channel (socket, pipe, etc.) and when a message is read from a channel, correlation and categorization can be done. In this case, the boundary could be put into an inter-process communication category.

During an architecture representing step 310, an embodiment represents a software architecture 120 by obtaining, preparing, displaying, and/or otherwise utilizing a software architecture diagram. Depending on context, the diagram in question may be a static diagram 122 or an enhanced diagram 204.

During a diagram comparing step 312, an embodiment compares two or more enhanced architecture diagrams 204. As with some other steps discussed herein, comparing step 312 may be viewed from either a system perspective or a user perspective. That is, depending on context, comparing 312 may be done by a system which automatically compares diagrams 204 under control of a tool 202 (using processor(s) 110 and memory), and/or comparing 312 may be done by a user 104 operating a tool 202. Any aspect of the enhanced diagrams may be compared, depending on the embodiment and the developer's instructions. For example, actual code paths 212, data values at boundaries 206, crossing/non-crossing of a boundary 206, and/or components dynamically loaded may be compared 312.

During a metadata attaching step 314, an embodiment (or a user directing an embodiment) attaches metadata 220 to an application data source 132. Metadata may take the form of attributes, messages, message content addenda, identifiers, and/or other data which would not be present in normal execution of the application 222 but are instead attached for diagnostic purposes. Metadata may be attached using familiar dynamic analysis tools and techniques.

During a type identifying step 316, an embodiment identifies one or more type 128 instances. Matching type instances in different parts of an application may be performed during correlation 306 to help stitch together static diagrams 122 using runtime information 210, namely, runtime-determined type instances. Step 316 may be accomplished using parsing, table lookup, and/or other familiar mechanisms.

During an identifier tracing step 318, an identifier injected into a communication channel 130 flow by the tool 202 is traced by the tool 202 from one location in the application to another. The injected identifier may be viewed as an example of metadata 220. Tracing an injected identifier as it travels to different parts of an application may be performed during correlation 306 to help stitch together static diagrams 122 using runtime information 210, namely, the identifier's path as it crosses a boundary 206. Identifier injection is sometimes referred to herein as "dye injection" and may be accomplished using familiar mechanisms.

During a causality hook using step 320, an embodiment uses a causality hook 338 during correlation 306. Step 320 may be accomplished using, for example, teachings provided in U.S. Pat. No. 7,293,256, which is incorporated herein by this reference.

During a message content comparing step 322, an embodiment compares message content at a caller with message content at a callee, to help stitch together static diagrams 122 during correlation 306 by using runtime information 210, namely, the message's path as it crosses a boundary 206. Content comparison may help distinguish messages from one another, making it possible to trace the path of a given message.

During a message time comparing step 324, an embodiment compares message time at a caller with message time at a callee, to help stitch together static diagrams 122 during correlation 306 by using runtime information 210, namely, the message's path as it crosses a boundary 206. Time comparisons supplemented by experimental data or assumptions about transmission latency may help distinguish messages from one another, making it possible to trace the path of a given message.

During a static structure acquiring step 326, an embodiment acquires a static architecture structure 214, e.g., by finding the structure in a network, in a local file system, or in RAM. Step 326 may be accomplished using filenames or other URIs generated by a correlation tool 202 if the tool 202 generates static diagrams 122, for example. Step 326 may also be accomplished using input from a user 104, even if the tool 202 works with a static diagram previously generated by some piece of software other than the tool 202.

During an enhanced architecture diagram deriving step 328, an embodiment derives an enhanced architecture diagram 204 from static information and runtime information. Deriving step 328 corresponds generally to correlating step 306, despite the difference in terminology. Two terms are used herein, to help illustrate different aspects of the teachings provided. Specifically, "correlating" may be understood to emphasize how the enhanced diagram 204 is derived, while "deriving" may be understood to emphasize what is being correlated in the enhanced diagram 204.

During a visual presenting step 330, an embodiment visually presents an enhanced diagram 204, e.g., by displaying the diagram 204 on a display 134 or in a printout.

During a metadata location indicating step 332, an embodiment indicates—during visual presenting step 330, for instance—one or more locations within an application of metadata 220. Indicated metadata may be attached to a data source, and/or may be injected identifiers that are being traced 318, for example. Metadata that describes some aspect of the diagram can come from a variety of sources, e.g., the user, other code analysis tools, other descriptions or documents.

During a memory configuring step 334, a memory medium 112 is configured by a correlation tool 202, an enhanced architecture diagram 204, or otherwise in connection with a static-runtime information correlation as discussed herein.

The foregoing steps and their interrelationships are discussed in greater detail below, in connection with various embodiments.

Some embodiments provide a process which correlates software architecture diagrams using runtime generated data. The process utilizes in a device a memory in operable communication with at least one logical processor. The process includes locating 302 a runtime determination boundary 206 in a software architecture. The software architecture is represented 310 at least partially by at least one software architecture diagram 122 (e.g., by a sequence diagram, a layer diagram, and so on). The process obtains 304 runtime information 210 (function level and/or otherwise) for at least one execution of an instance 124 of the software architecture, and correlates 306 at least a portion of the runtime information with the at least one software architecture diagram. The process thus produces an enhanced architecture diagram 204 which documents an execution history across the runtime determination boundary.

In some embodiments, the locating step 302 determines 308 that the runtime determination boundary fits within at least one of the following categories 336: client-server boundaries, machine-machine boundaries, database-querying_program boundaries, web_service_provider-web_service_consumer boundaries, factory_caller-factory_instance boundaries, interface_call-implementing_class boundaries, reflection boundaries. However, these are not necessarily the only possible boundaries 206. Different boundary categories 336 may also be used. Some other examples of runtime determination boundary categories include: order processing component-external credit card processing service boundaries, inventory system-inventory database boundaries, GUI creator-system configuration boundaries, boundaries defined by code making use of a database that is selected by an end user, and boundaries defined by code making use of a web service where the endpoint is looked up from a database. A given boundary 206 may belong to one or more categories 336.

In some embodiments, the process compares 312 two or more diagrams 204. For example, one process includes the foregoing locating, obtaining, and correlating steps and also includes obtaining 304 runtime information for another execution of the same instance of the software architecture, correlating 306 at least a portion of that runtime information with the at least one software architecture diagram, thereby producing another enhanced architecture diagram which documents an execution history across the runtime determination boundary, and then comparing 312 the two enhanced architecture diagrams. As another example, one process includes the original locating, obtaining, and correlating steps above and also includes obtaining 304 runtime information for an execution of a different instance of the software architecture, correlating 306 at least a portion of that runtime information with the at least one software architecture diagram, thereby producing another enhanced architecture diagram which documents an execution history across the runtime determination boundary, and then comparing 312 the two enhanced architecture diagrams.

Familiar mechanisms are available in static analysis to attach metadata to the nodes of an architectural diagram or program graph and use that data for static validation. In some embodiments provided herein, however, a process attaches 314 metadata 220 to a data source 132, and execution propagates the metadata across the runtime determination boundary 206. For example, a process may attach metadata to a data source to indicate 332 location(s) where data is trusted.

More generally, the type of metadata 220 attached 314 may vary widely, depending on what a developer wants to know about the program being analyzed. Metadata could indicate the source of the data and whether that source is trusted or not. Metadata could indicate something about the value of the data, e.g., whether it is null (based, e.g., on a conditional block testing for null). Metadata could indicate something about the way the data is allocated, e.g., whether it is garbage collected or needs to be explicitly freed by the consumer. Unlike a purely static space in which analysis does not cross runtime boundaries, some embodiments carry attached metadata across a boundary 206 to a second architectural diagram/program graph which is not connected statically. Once the diagrams are connected by correlation using the runtime information, one can attach that metadata to the nodes in the diagram/graph and flow it across the runtime boundary 206.

In some embodiments, one can use attached metadata to detect tainted data flow. After correlating 306 systems across boundaries 206, one has a control flow graph that may encapsulate an entire application. One can then extend any control flow/data flow analysis from within each discrete component to the entire application. For example, if untrusted data comes into one component (e.g., as an URL query parameter) and is then passed to a second component across a boundary, an embodiment can continue to mark that data as untrusted for any data flow analysis done in the second component instead of making an assumption about the data. As the data passes through components in the application 222, the metadata allows the embodiment to retain the untrusted designation to get a more complete application analysis. Also, if the data passes through a known cleansing function, metadata 220 can be attached to mark the data as trusted and to retain that designation through application analysis. Thus, an embodiment may avoid reporting on the use of supposedly untrusted data which is actually trusted.

In some embodiments, the correlating step 306 includes identifying 316 type instances. For example, instances of types being called may be identified 316 based on type names, based on type contents, using object identifiers recorded during execution, and/or based on the number of types.

In some embodiments, the correlating step 306 includes tracing 318 an identifier injected into a communication channel using familiar "dye injection" mechanisms. In some, correlating 306 includes using a causality hook 338. In some, correlating 306 includes comparing 322 a content of a message leaving a caller with a content of a message entering a callee, and in some, comparing 324 a time of a message leaving a caller with a time of a message entering a callee.

Some embodiments perform a correlation process which includes obtaining 304 runtime information for an execution of an instance of a software architecture, acquiring 326 a static architecture structure containing static information about the software architecture, deriving 328 an enhanced architecture diagram from the runtime information and the static information (the enhanced architecture diagram documents an execution history for the instance across a runtime determination boundary), and visually presenting 330 the enhanced architecture diagram in at least one of: a display, a printout.

For example, one embodiment acquires 326 a static architecture structure 214 in the form of a static spanning architecture diagram, namely, a diagram representing portions of the software architecture on opposite sides of the runtime determination boundary 206. Then the embodiment derives 328 an enhanced architecture diagram (at least in part; other acts may be involved) by modifying the static spanning architecture diagram to include correlations between the diagram and runtime information for the instance of the software architecture.

As another example, one embodiment acquires 326 a static architecture structure in the form of a first static architecture diagram 122 representing a first portion of the software architecture on a first side of the runtime determination boundary 206, and a second static architecture diagram 122 representing a second portion of the software architecture on a second side of the runtime determination boundary 206. Then the embodiment derives 328 an enhanced architecture diagram (at least in part; other acts may be involved) by combining those diagrams using runtime information 210 for the instance of the software architecture.

As a further example, one embodiment acquires 326 a static architecture structure in the form of a static data graph 218 based on a static analysis of the instance of the software architecture. Then the embodiment derives 328 an enhanced architecture diagram 204 (at least in part; other acts may be involved) by modifying the static data graph to reflect runtime information 210 for the instance of the software architecture, and then generating the enhanced architecture diagram based on the modified data graph.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as correlation tools 202 and/or enhanced architecture diagrams 204, in the form of data 118 and instructions 116, read from a removable medium 114 and/or another source such as a network connection, to form a configured medium. The configured medium 112 is capable of causing a computer system to perform process steps for transforming data through derivation of enhanced architectural diagrams 204 as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Regarding an approach to correlating static software diagrams using runtime generated data, first consider the following. One can generate static software diagrams using familiar static code exploration mechanisms such as control flow analysis based on modeling or interpreting the code. Tools such as the sequence diagram in the Microsoft® Visual Studio® 2010 environment and static code analysis tools such as the Microsoft® FxCop tool and the Microsoft® PREfast tool make use of static analysis techniques (marks of Microsoft Corporation).

In general, static code exploration makes assumptions about control that cannot be confirmed without executing the program, such as the result of conditional statements or the number of iterations through loops. Additionally, for loosely-coupled systems, static code analysis cannot know, without running the program, what class, data, and/or service will ultimately be used by the system. For example, consider the following code:

```
1  if (CustomerOrder.Purchase(creditCardNumber) ==
   PurchaseResult.Success)
2  {
3      Console.WriteLine("Purchase successful");
4  }
5  else
6  {
7      Console.WriteLine("Purchase failed");
8  }
```

In line 1, static code analysis cannot know the result of calling the Purchase function; the call could be successful or it could fail. For this reason, a comprehensive static code analysis models both paths of the conditional statement, even though, for a given execution, only one path will be taken. A result of this modeling is shown in sequence diagrams such as those provided in a Microsoft® Visual Studio® 2010 environment, where both paths are shown.

Also in line 1, if CustomerOrder is a web service, then static code analysis cannot know which endpoint is providing this service, which is bound at runtime. Similarly, static code analysis alone cannot determine what services the CustomerOrder web service may make use of, such as which credit card authorization service or which customer order history service may be used, if any.

In short, using static code analysis techniques, one may only be able to create separate diagrams for each system that cover code paths that can be understood statically. Static analysis alone does not connect those diagrams together or explain the exact path that will be taken in any given program run.

By contrast, some embodiments using information collected from the application at runtime (using the IntelliTrace™ feature in Microsoft® Visual Studio® 2010 solutions, for example). Then the actual execution flow can be connected to the architectural diagrams, and diagrams from multiple systems can be connected together by correlating calls between the systems, as taught herein.

Using data collected while the application 222 is running, runtime elements (such as which methods are called and the execution path taken through the method) can be used to create architectural diagrams 204 or connect existing static architectural diagrams 122 (such as sequence diagrams) to show the actual path 212 of execution. One may create or connect to the instance-level lifelines in a sequence diagram, for example. Various techniques may be used to do this during correlation 306 and derivation 328, including heuristic-based object matching or object id tracking, for example. Once the runtime data is used to create or connect to an architectural diagram, those diagrams can be connected together by correlating calls between diagrams.

Using of techniques to correlate 306 calls between systems (such as dye injection, causality, message comparisons, time comparisons, etc.) the runtime data of exactly what systems are invoked, what systems those systems invoke, and so on can be used to connect separate diagrams together, producing an enhanced architecture diagram 204 that spans runtime boundaries 206. Runtime data provides this connection, since, in loosely-coupled systems, the configuration of services and systems used is not known until runtime, and can change over the lifetime of a run.

One embodiment for combining static and dynamic data to produce diagrams 204 correlated across system boundaries 206 follows, in pseudo code form. Note that sequence diagrams and the IntelliTrace™ feature are merely specific examples; other embodiments may use different diagrams and/or different runtime information gathering mechanisms. In this context, the pseudocode form for one approach is as follows:

1. Generate a static sequence diagram 122 using a tool such as the Microsoft® Visual Studio® 2010 solution.
2. Generate an IntelliTrace™ runtime log of the application that contains at least function-level call information 210, but may contain more finely grained information, such as the path taken through the function.
3. Correlate 306 function level (and intra-function level) runtime information (what functions are called in what order) with the static sequence diagram using at least one of the following techniques:
   a. Identify 316 instances of types being called by their name and/or content using some comparison function and connect those instances to the instances generated by the static sequence diagram generator.
   b. Identify 316 instances of types by an object id recorded at runtime that identifies each instance and connect those instances to the instances generated by the static sequence diagram generator.
4. Derive an enhanced diagram 204 in part by connecting separate sequence diagrams together using correlation information from the IntelliTrace™ log. Where the static sequence diagram contains a function call without an endpoint, fill in the endpoint using a correlation technique such as:
   a. Use dye injection tracing 318 to connect the caller to the callee by injecting a traceable identifier into the communication channel (such as an additional header into an http request/response).
   b. Use 320 a causality hook as described in U.S. Pat. No. 7,293,256, incorporated herein.
   c. Use a heuristic to compare 322 messages leaving the caller and entering the callee and connect those that satisfy some compare function.
   d. Use a heuristic to compare 324 times and connect messages that occur relatively close in time (using a time comparison function).

Figure 4:
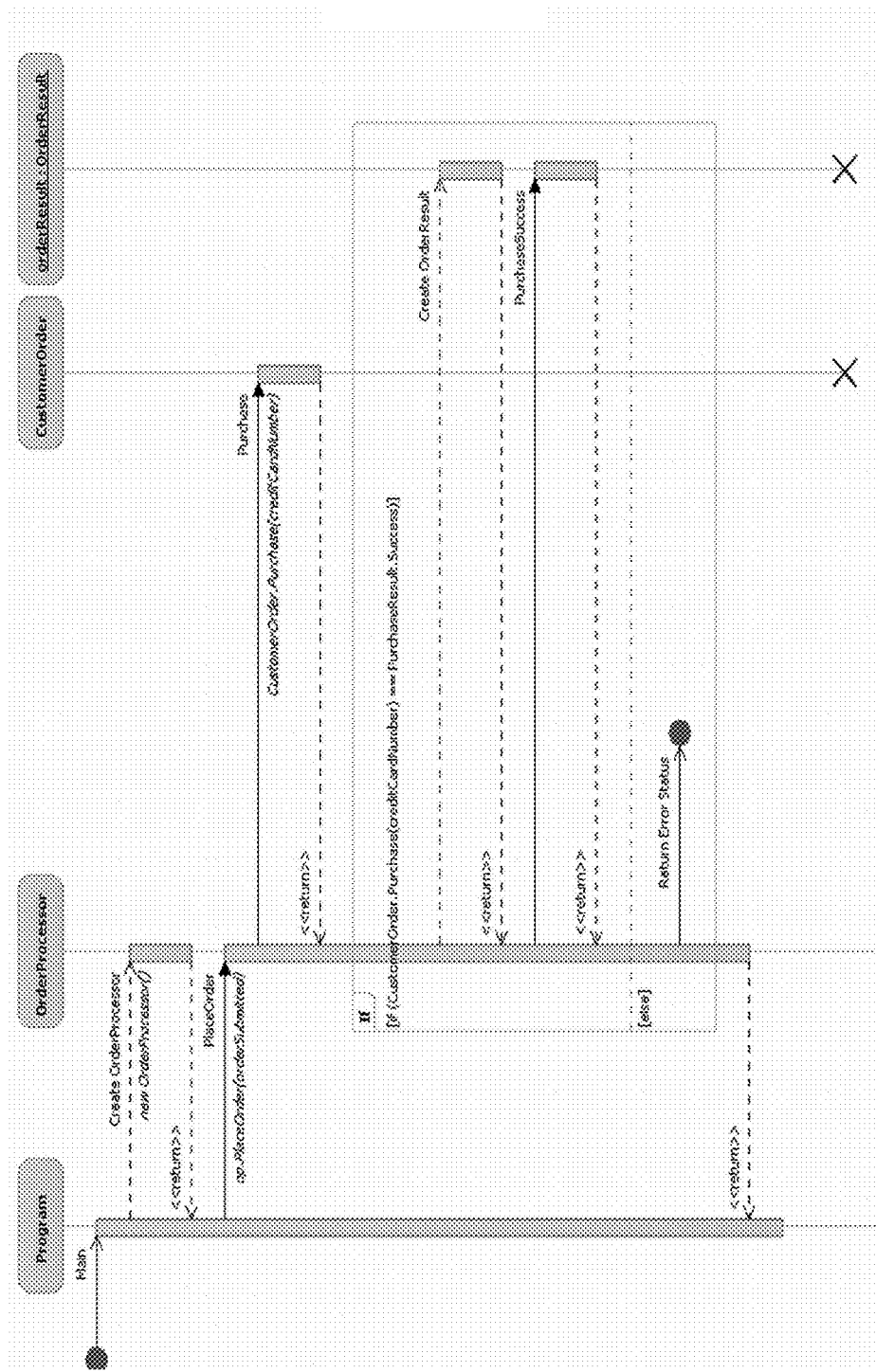
FIG. 4 shows an example of a static architecture diagram suitable for undergoing correlation as taught herein.

FIGS. 4 through 8 further illustrate some embodiments. FIG. 4 shows an example of a static architecture diagram suitable for correlation 306 as taught herein. Specifically, FIG. 4 shows a sequence diagram, which is a kind of interaction diagram 122. The sequence diagram and many other diagrams discussed herein are compatible with Unified Modeling Language (UML), and some embodiments integrate correlation 306 functionality with UML diagramming functionality. However, some embodiments may use static architecture diagrams which are not consistent with UML, and some may use diagramming functionality which is not supported by UML tools.

Figure 5:
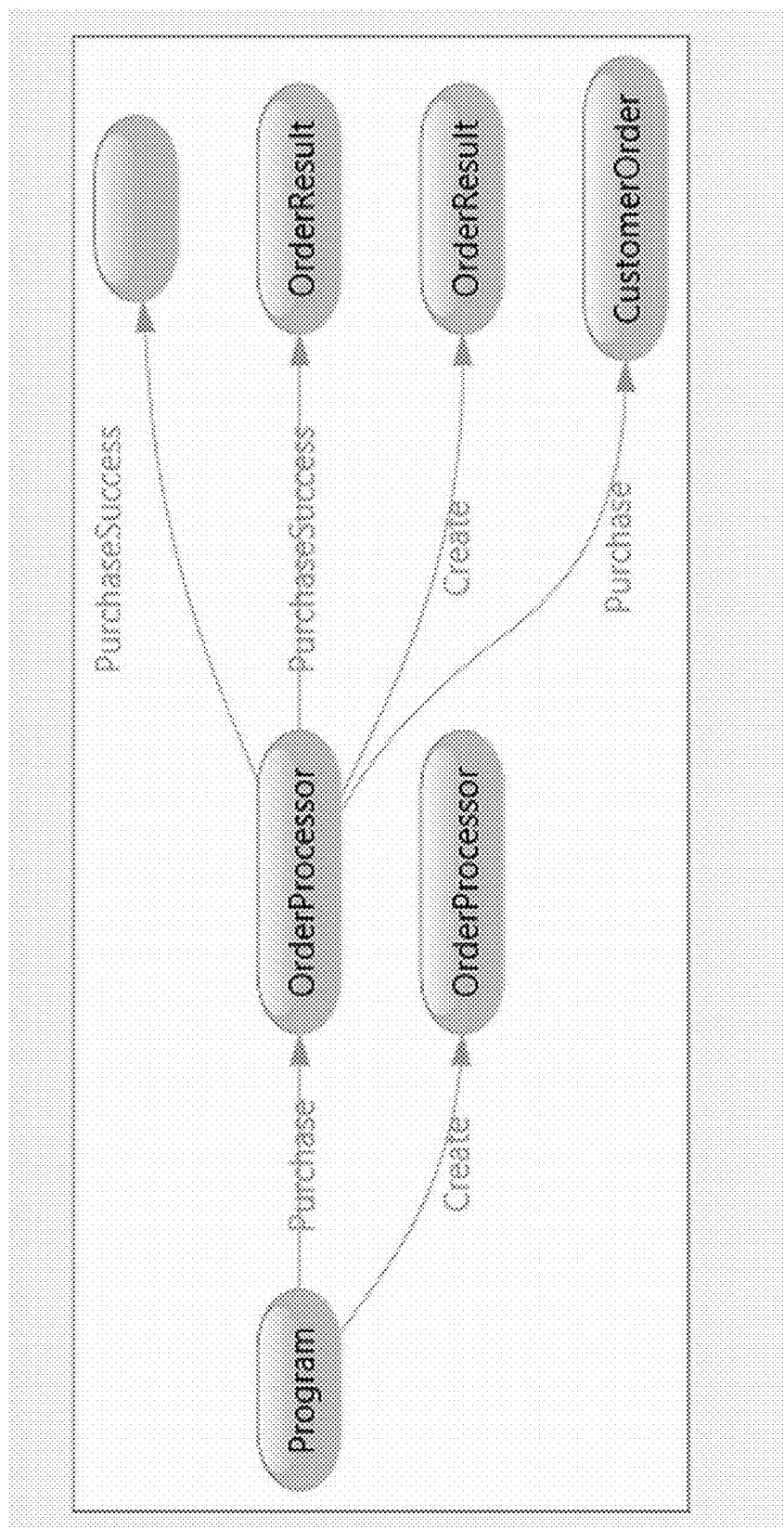
FIG. 5 shows an example of a static architecture structure in the form of a graph, suitable for undergoing correlation as taught herein.

FIG. 5 provides a different view of the software architecture shown in FIG. 4. Specifically, FIG. 5 shows a data flow diagram, which is also an example of a static architecture structure in the form of a graph. As used herein, a "graph" may be an architecture diagram or any other data structure, provided the structure has nodes connected by links. FIG. 5 may thus be characterized as a graph and/or as a diagram.

FIG. 6 shows an enhanced architecture diagram produced by correlating 306 runtime information with the static architecture diagram of FIG. 4. In this example, the FIG. 4 diagram has been enhanced in two ways.

First, the identity of an order submitted during execution has been noted and is available to the developer. In particular, an annotation box 602 states "orderSubmitted–orderId=12", meaning that an orderId value of 12 was captured at runtime with the orderSubmitted variable passed at runtime to the op.PlaceOrder( ) routine. In a correlation tool 202, runtime information (such as the ID of a particular order, or other info) could be displayed in a pop-up box 602 such as a tooltip or in a more permanent box 602, for example, thereby augmenting the static diagram with information that may help improve understanding of the code. More generally, once one has made a runtime to static correlation 306, one can then associate additional data that was collected at runtime with the original static diagram to produce an enhanced diagram. In a given embodiment, such an association may happen either at runtime or any time after runtime.

Second, the actual path taken by the code during execution is shown on the FIG. 6 enhanced diagram. In this illustration, wider lines and numbering on the events mark the path taken. The portions of this code path are labeled as "1. Main", "2. Create OrderProcessor", "3. Place Order", "4. Purchase", "5. Create OrderResult", and "6. PurchaseSuccess". In a correlation tool 202, coloring, movement, line width, animation of the diagram, and/or other highlighting mechanisms may be used to mark the path taken. Also, a given enhanced architecture diagram 204 may display runtime values (e.g., orderID), may display the code path 212, and/or may be enhanced in other ways as taught herein.

Figure 7:
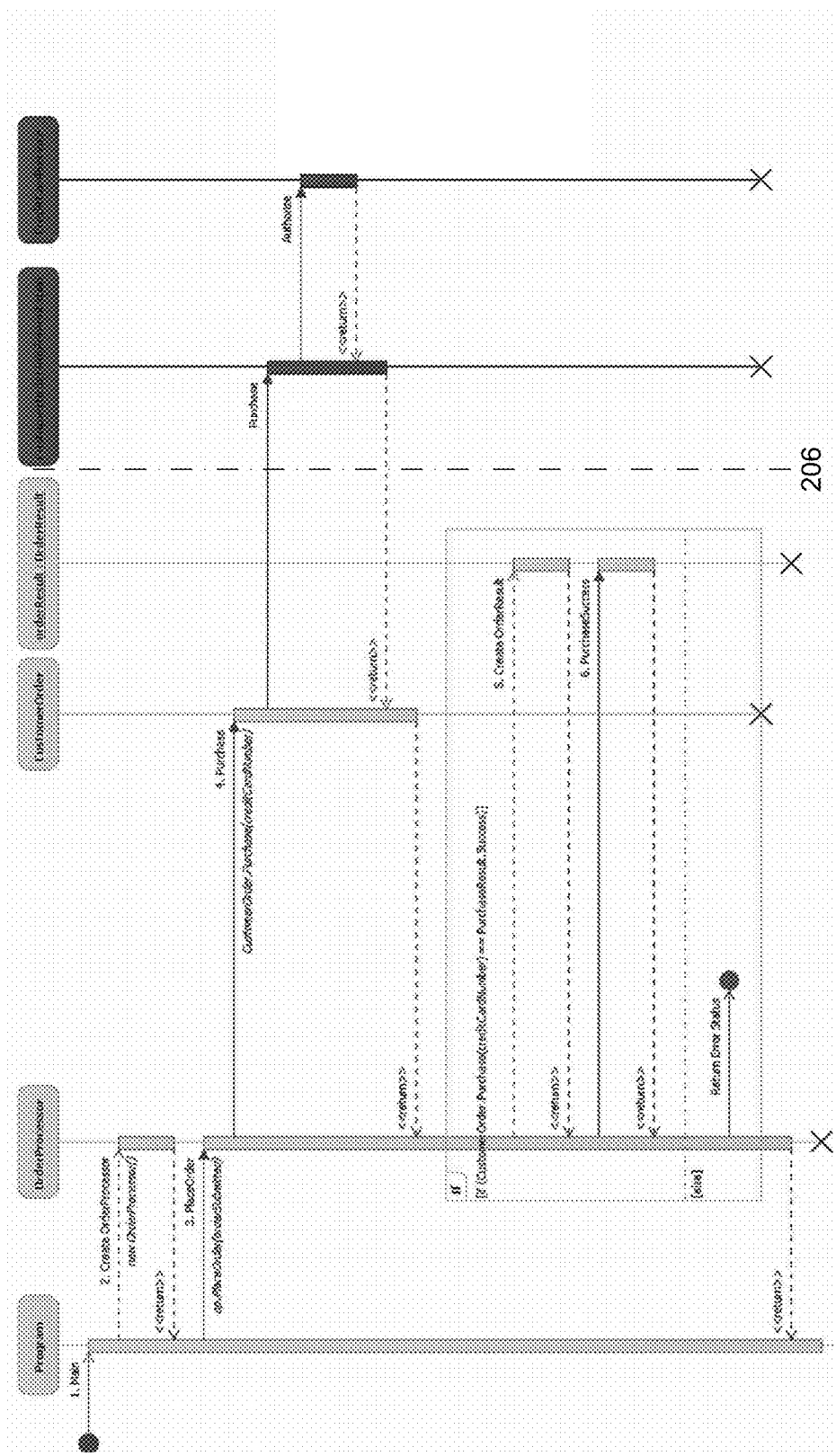
FIG. 7 shows an enhanced architecture diagram which spans a runtime determination boundary, produced by correlating runtime information with the static architecture diagram of FIG. 4 and other static information.

FIG. 7 shows an enhanced architecture diagram which spans a runtime determination boundary 206 that is located in this example between an "orderResult:OrderResult" component and a "CustomerOrderImplementation" component. Because CustomerOrderImplementation is a web service, the boundary 206 could not be bridged with a purely static analysis. By correlating runtime information with the static architecture diagram of FIG. 4 and with other static information for the rightmost components CustomerOrderImplementation and CreditCardService, the boundary 206 can be bridged, facilitating improved understanding of the code across the boundary.

Figure 8:
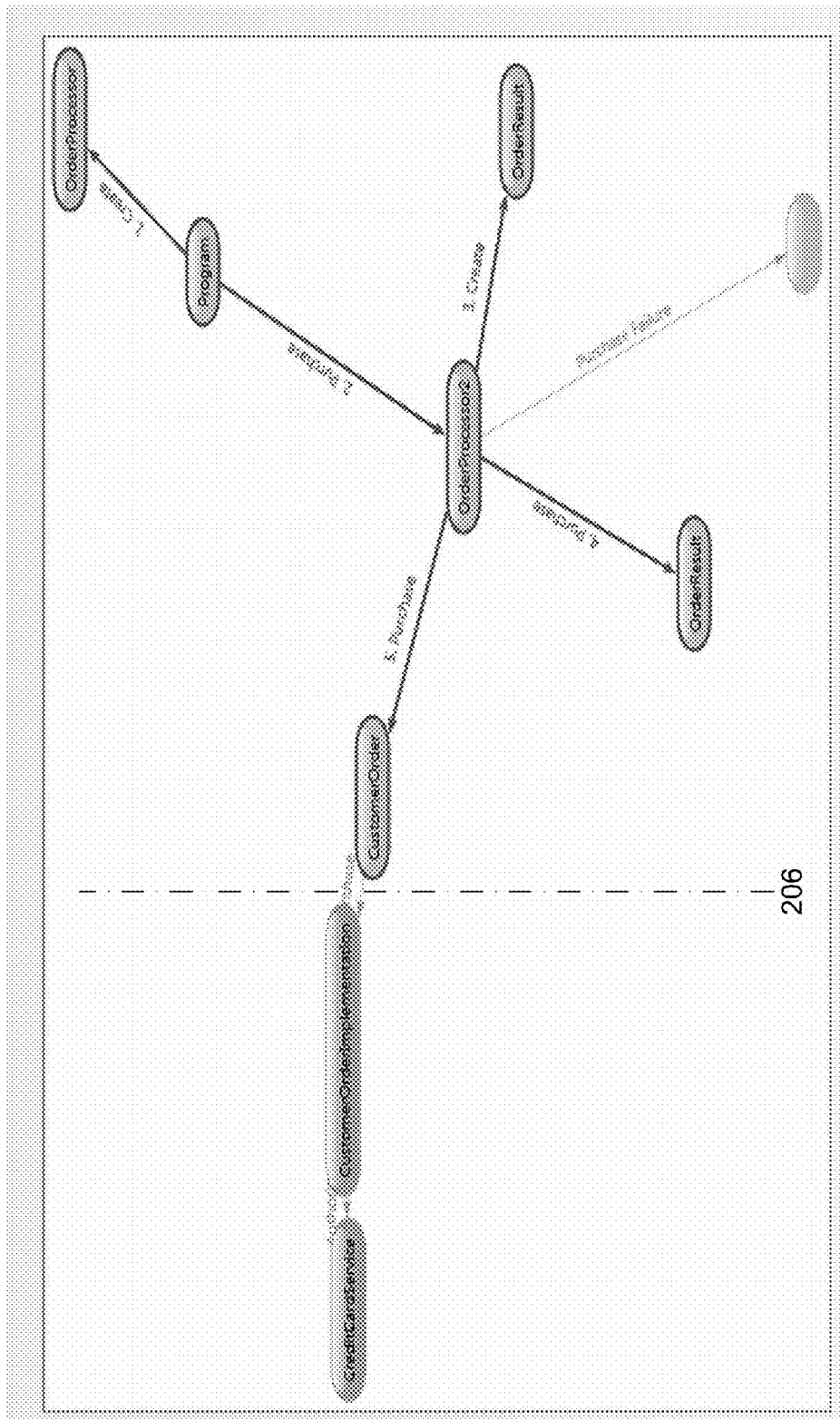
FIG. 8 shows an enhanced architecture diagram which spans a runtime determination boundary, produced by correlating runtime information with static information in the form of graphs.

FIG. 8 shows an enhanced architecture diagram which spans a runtime determination boundary 206. FIG. 8's diagram shows a result of correlating runtime information with static information in the form of two graphs, namely, the graphs on each side of the boundary 206.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process which correlates software architecture diagrams using runtime generated data, the process utilizing in a device a memory in operable communication with at least one logical processor, the process comprising the steps of:

locating a runtime determination boundary in a software architecture which is not a reflection boundary, the software architecture represented at least partially by at least one software architecture diagram;

obtaining runtime information for at least one execution of an instance of the software architecture without using reflection to obtain said runtime information;

correlating at least a portion of the runtime information with the at least one software architecture diagram, thereby producing an enhanced architecture diagram which documents an execution history across the runtime determination boundary, namely, an enhanced architecture diagram which spans at least two components by spanning at least one component of the software architecture on each side of the runtime determination boundary; and attaching metadata to a data source, and propagating the metadata across the runtime determination boundary.

2. The process of claim 1, wherein the locating step comprises determining that the runtime determination boundary fits within at least one of the following categories:

client-server boundaries;
machine-machine boundaries;
database-querying_program boundaries;
web_service_provider-web_service_consumer boundaries;
factory_caller-factory_instance boundaries;

interface_call-implementing_class boundaries;
inter-process communication boundaries.

3. The process of claim 1, further comprising representing the software architecture by at least one of the following software architecture diagrams:
   a sequence diagram;
   a layer diagram;
   an activity diagram;
   a class diagram;
   a dependency diagram.

4. The process of claim 1, wherein the step of obtaining runtime information obtains function level runtime information.

5. The process of claim 1, further comprising:
   obtaining runtime information for another execution of the same instance of the software architecture;
   correlating at least a portion of that runtime information with the at least one software architecture diagram, thereby producing another enhanced architecture diagram which documents an execution history across the runtime determination boundary; and
   comparing the two enhanced architecture diagrams.

6. The process of claim 1, further comprising:
   obtaining runtime information for an execution of a different instance of the software architecture;
   correlating at least a portion of that runtime information with the at least one software architecture diagram, thereby producing another enhanced architecture diagram which documents an execution history across the runtime determination boundary; and
   comparing the two enhanced architecture diagrams.

7. The process of claim 1, wherein the correlating step comprises at least one of the following:
   identifying instances of types being called based on type names;
   identifying instances of types being called based on type contents;
   identifying instances of types by object identifiers recorded during execution;
   identifying instances of types based on the number of types;
   identifying instances of types based on communication infrastructure tracing.

8. The process of claim 1, wherein the correlating step comprises at least one of the following:
   tracing an identifier injected into a communication channel;
   tracing data stored in a storage medium by a first component and retrieved from the storage medium by a second component;
   using a causality hook;
   comparing a content of a message leaving a caller with a content of a message entering a callee;
   comparing a time of a message leaving a caller with a time of a message entering a callee.

9. The process of claim 1, wherein the locating step comprises determining that the runtime determination boundary fits within at least one of the following categories:
   factory_caller-factory_instance boundaries;
   interface_call-implementing_class boundaries;
   inter-process communication boundaries.

10. A computer-readable memory configured with data and with instructions that when executed by at least one processor causes the processor(s) to perform a correlation process comprising the steps of:
   obtaining runtime information for an execution of an instance of a software architecture without using reflection to obtain said runtime information;
   acquiring a static architecture structure containing static information about the software architecture;
   deriving an enhanced architecture diagram from the runtime information and the static information, the enhanced architecture diagram documenting an execution history for the instance across a runtime determination boundary which is not a reflection boundary, the enhanced architecture diagram spanning at least two components by spanning at least one component of the software architecture on each side of the runtime determination boundary;
   attaching metadata to a data source, and propagating the metadata across the runtime determination boundary; and
   visually presenting the enhanced architecture diagram in at least one of: a display, a printout.

11. The configured computer-readable memory of claim 10, wherein the process comprises:
   acquiring a static architecture structure in the form of a static spanning architecture diagram, namely, a diagram representing portions of the software architecture on opposite sides of the runtime determination boundary; and
   deriving an enhanced architecture diagram at least in part by modifying the static spanning architecture diagram to include correlations between the diagram and runtime information for the instance of the software architecture.

12. The configured computer-readable memory of claim 10, wherein the process comprises:
   acquiring a static architecture structure in the form of a first static architecture diagram representing a first portion of the software architecture on a first side of the runtime determination boundary, and a second static architecture diagram representing a second portion of the software architecture on a second side of the runtime determination boundary; and
   deriving an enhanced architecture diagram at least in part by combining those diagrams using runtime information for the instance of the software architecture.

13. The configured computer-readable memory of claim 10, wherein the process comprises:
   acquiring a static architecture structure in the form of a static data graph based on a static analysis of the instance of the software architecture; and
   deriving an enhanced architecture diagram at least in part by modifying the static data graph to reflect runtime information for the instance of the software architecture, and then generating the enhanced architecture diagram based on the modified data graph.

14. The configured computer-readable memory of claim 10, wherein the process further comprises determining that the runtime determination boundary fits within at least one of the following categories:
   client-server boundaries;
   machine-machine boundaries;
   database-querying_program boundaries;
   web_service_provider-web_service_consumer boundaries;
   factory_caller-factory_instance boundaries;
   inter-process communication boundaries.

15. The configured computer-readable memory of claim 10, wherein the process further comprises attaching metadata to data and indicating multiple locations of the metadata within the enhanced architecture diagram.

16. The configured computer-readable memory of claim 10, wherein the deriving step comprises at least three of the following:
- identifying instances of types being called based on type names;
- identifying instances of types being called based on type contents;
- identifying instances of types by object identifiers recorded during execution;
- identifying instances of types based on the number of types;
- identifying instances of types based on communication infrastructure tracing;
- tracing an identifier injected into a communication channel;
- tracing data stored in a storage medium by a first component and retrieved from the storage medium by a second component;
- employing a user-identified correlation;
- using a causality hook;
- comparing a content of a message leaving a caller with a content of a message entering a callee;
- comparing a time of a message leaving a caller with a time of a message entering a callee.

17. A computer system comprising:
- a logical processor;
- a memory in operable communication with the logical processor;
- an enhanced architecture diagram residing in the memory, the enhanced architecture diagram documenting an execution history for an instance of a software architecture across a runtime determination boundary which is not a reflection boundary, the enhanced architecture diagram spanning at least two components by spanning at least one component of the software architecture on each side of the runtime determination boundary; and
- software residing in the memory which upon execution by the logical processor performed a process that includes locating the runtime determination boundary, obtaining runtime information for the execution history without using reflection to obtain said runtime information, correlating at least a portion of the runtime information with at least one software architecture diagram, thereby producing the enhanced architecture diagram which documents the execution history across the runtime determination boundary, attaching metadata to a data source, and propagating the metadata across the runtime determination boundary.

18. The system of claim 17, wherein the enhanced architecture diagram includes and spans at least one of the following runtime determination boundaries:
- a client-server boundary;
- a machine-machine boundary;
- a database-querying_program boundary;
- a web_service_provider-web_service_consumer boundary.

19. The system of claim 17, wherein the enhanced architecture diagram comprises at least one of the following software architecture diagrams:
- a layer diagram;
- an activity diagram;
- a class diagram;
- a dependency diagram.

20. The system of claim 17, wherein the enhanced architecture diagram comprises a highlighted code path correlated with runtime information from the execution history.

* * * * *